United States Patent [19]

Kiyoura et al.

[11] Patent Number: 4,828,815

[45] Date of Patent: May 9, 1989

[54] PRODUCTION PROCESS OF CHLORINE

[75] Inventors: Tadamitsu Kiyoura, Kanagawa; Masanobu Ajioka; Naoshi Fujimoto, both of Fukuoka; Toshihide Suzuki, Fukuoka; Yasuo Kogure; Tokio Nagayama, both of Kanagawa; Kazuo Kanaya, Kanagawa, all of Japan

[73] Assignee: Mitsui Toatsu Chemicals, Incorporated, Tokyo, Japan

[21] Appl. No.: 132,665

[22] Filed: Dec. 10, 1987

Related U.S. Application Data

[63] Continuation of Ser. No. 804,149, Dec. 3, 1985, abandoned.

[30] Foreign Application Priority Data

Dec. 3, 1984 [JP] Japan .................................. 59-254234
May 28, 1985 [JP] Japan .................................. 60-113238
Nov. 14, 1985 [JP] Japan .................................. 60-253646

[51] Int. Cl.$^4$ .......................... C01B 7/04; B01J 21/08; B01J 23/26
[52] U.S. Cl. ..................................... 423/502; 423/507; 502/256; 502/319
[58] Field of Search ............... 423/502, 507, DIG. 13, 423/607; 502/237, 256, 319

[56] References Cited

U.S. PATENT DOCUMENTS

| | | | |
|---|---|---|---|
| 2,258,111 | 10/1941 | Engel .................................... | 502/319 |
| 2,382,582 | 8/1945 | Ruthruff .............................. | 502/237 |
| 3,006,732 | 10/1961 | Baumgartner et al. ............. | 423/502 |
| 3,542,520 | 11/1970 | Borkowski .......................... | 423/502 |
| 3,667,913 | 6/1972 | Hund .................................. | 423/502 |

FOREIGN PATENT DOCUMENTS

| | | | |
|---|---|---|---|
| 1182643 | 2/1970 | United Kingdom ................ | 423/507 |
| 1415646 | 11/1975 | United Kingdom ................ | 502/256 |

OTHER PUBLICATIONS

Comprehensive Inorganic Chemistry, J. C. Bailer Jr., et al. Pergamon Press., 1973, pp. 665–666.
Chromium, vol. 1, Marvin J. Udy, Reinhold Publishing Company, 1956, p. 188.
*Catalog Handbook of Fine Chemicals*, (1982), Aldrich, p. 240.
CAS Online, 1967–1987, 106(22).
CPI (Derwent), 1970–1986, 34W. Merck Index, 9th Edition (1976), p. 290.

*Primary Examiner*—John Doll
*Assistant Examiner*—Jeffrey E. Russel
*Attorney, Agent, or Firm*—Oblon, Fisher, Spivak, McClelland & Maier

[57] ABSTRACT

Chlorine can be efficiently produced at a low temperature and with a high hourly space velocity by oxidizing hydrogen chloride with an oxygen-containing gas in the presence of a catalyst obtained by calcining a compound, which has in turn been obtained by reacting chromium nitrate, chromium chloride, the chromium salt of an organic acid or the like with ammonia, or by calcining a mixture of the compound and a silicon compound, preferably, at a temperature lower than 800° C.

7 Claims, No Drawings

PRODUCTION PROCESS OF CHLORINE

This application is a continuation of application Ser. No. 804,149, filed on Dec. 3, 1985 now abandoned.

BACKGROUND OF THE INVENTION (a) Field of the Invention

This invention relates to an improved process for producing chlorine by oxidizing hydrogen chloride with an oxygen-containing gas in the presence of a catalyst at a low temperature and in a gas phase.

Chlorine is produced on large scale by the electrolysis of sodium chloride. In spite of the everincreasing demand for chlorine, the demand for caustic soda which occurs simultaneously upon the electrolysis of sodium chloride is lower than that for chlorine. Difficulties have thus been encountered in meeting their different demands appropriately.

On the other hand, a great deal of hydrogen chloride is obtained as the by-produced of the chlorination or phosgenation reaction of an organic compound. Since the volume of this hydrogen chloride is significantly higher than the demand level for hydrochloric acid, lots of hydrogen chloride is disposed of wastefully without its utilization. Furthermore, the treatment cost for its disposal has reached a considerable value.

It is thus possible to meet the demand for chlorine without developing an imbalance between its production level and that of caustic soda, provided that chlorine can be efficiently recovered from hydrogen chloride which is disposed of in a large volume as described above.

(b) Description of the Prior Art

The reaction in which hydrogen chloride is oxidized to produce chlorine has been known as the Deacon reaction for many years. The copper-based catalysts which Deacon invented in 1868 have conventionally been considered to show the best activities. A number of proposals have been made on catalysts which contain various compounds added as a third component to copper chloride and potassium chloride. In order to oxidize hydrogen chloride at an industrially-satisfactory reaction velocity with these catalysts, it is however necessary to raise the reaction temperature to 450° C. or higher. At such high reaction temperatures, a problem arises that their catalytic service life is shortened due to scattering of their catalyst components. In addition, the oxidation reaction of hydrogen chloride has an equilibrium point. The yield of chlorine decreases as the temperature goes up. It is thus required to develop a catalyst which possesses activity at a temperature which is as low as possible.

From the above-described viewpoint, iron-based catalysts and some other catalysts have been proposed as catalysts other than copper-based catalysts. However, the present inventors are still not aware of any catalysts which may exhibit fully practical quality and performance. It has also been proposed to employ chromium oxide as a catalyst for the oxidation of hydrogen chloride because chromium oxide has better stability and durability at elevated temperatures than copper and the like. As far as the present inventors are aware of, none of such chromium oxide catalysts have yet been reported to have shown satisfactory activities. For example, it is disclosed in U.K. Patent Specification No. 584,790 that hydrogen chloride is caused to flow at about 400° C. over a catalyst, which has been prepared by impregnating a suitable carrier with chromic anhydride or an aqueous solution of chromium nitrate and then subjecting the thus-impregnated carrier to pyrolysis, to produce chlorine; and after deactivation of the catalyst, the supply of hydrogen chloride is cut off and air is in turn caused to flow so as to regenerate the catalyst, and the supply of air is then stopped and the supply of hydrogen chloride is instead resumed. In U.K. Patent Specification No. 676,667, hydrogen chloride and an oxygen-containing gas were reacted at 420°–430° C. in the presence of a catalyst composed of a carrier and a bichromate or heavily dark green chromium oxide supported on the carrier, whereby hydrogen chloride conversions of 67.4% and 63%, both based on the equilibrium value, were achieved at hourly space velocities of 380 hr$^{-1}$ and 680 hr$^{-1}$ respectively. The occurrence of the reaction was still observed at 340° C. However, the hourly space velocity was controlled at such a low level as 65 hr$^{-1}$ and the resultant conversion was as low as 52%.

As mentioned above, even when chromium oxide is used as a catalyst, it is not of such quality that it can withstand an industrial operation because the reaction temperature is high and the hourly space velocity is low in each of such conventional processes. In other words, the chromium oxide catalysts which have conventionally been reported are not believed to exhibit any specifically excellent performance compared with the copper-base catalysts.

SUMMARY OF THE INVENTION

An object of this invention is to provide a process for recovering chlorine from hydrogen chloride with good efficiency by using a catalyst which is active at low temperatures and permits the oxidation of hydrogen chloride in a large volume (i.e., a high hourly space velocity).

The present inventors have carried out research on the production process of chlorine by the oxidation of hydrogen chloride, especially, on catalysts useful in the oxidation of hydrogen chloride. As a result, it has been found that chlorine can be produced from hydrogen chloride at a higher hourly space velocity and with a conversion significantly higher than those achieved by conventional processes when a chromium oxide catalyst prepared in accordance with a process, which has not been reported to date with respect to the oxidation of hydrogen chloride, is used. This finding has led to completion of this invention.

In one aspect of this invention, there is thus provided a process for producing chlorine by oxidizing hydrogen chloride with an oxygen-containing gas, which comprises effecting the oxidation in the presence of a catalyst prepared from a chromium compound which has been obtained by reacting chromium nitrate, chromium chloride or the chromium salt of an organic acid with ammonia.

In another aspect of this invention, there is also provided a process for producing chlorine by oxidizing hydrogen chloride with an oxygen-containing gas, which comprises effecting the oxidation in the presence of a catalyst prepared from a chromium compound, which has been obtained by reacting a chromium salt with ammonia, and a silicon compound.

The catalyst may preferably be used after calcining same at a temperature lower than 800° C.

As mentioned above, the present invention makes it possible to produce chlorine from hydrogen chloride at an hourly space velocity and with a conversion which are significantly higher than those available by conventional processes.

DETAILED DESCRIPTION OF THE INVENTION

As hydrogen chloride useful as a raw material in the practice of the process of this invention, it is generally possible to make wide use of byproduced hydrochloric acid such as that byproduced upon chlorination of organic compounds or that byproduced by the reaction between phosgene and organic compounds.

The oxygen-containing gas is used as an oxidizing agent for hydrogen chloride. Oxygen gas or air may be used in many instances. Oxygen gas may preferably be used where the reactor is of the fluidized bed type, whereas air may favorably be used where the reactor is of the fixed bed type. As the molar ratio of hydrogen chloride to the oxygen in an oxygen-containing gas, which are both to be fed for the reaction, the oxygen is used in an amount of about ¼ mole (equivalent) or so per mole of hydrogen chloride. In many instances, oxygen is generally used 5%–200% in excess of its equivalent. It is suitable to feed hydrochloric acid to a catalyst bed at a flow rate in the range of 200–1800 Nl/hr.kgCat. As the reaction temperature, 300°–400° C. or particularly 330°–390° C. are employed frequently. A pressure range of from normal pressure or so to 1–10 kg/cm$^2$G is often used as the reaction pressure. The conversion of hydrogen chloride increases as the pressure becomes higher.

The catalyst useful in the practice of the process of this invention is obtained from a chromium compound which has been formed by reacting a chromium salt, which was obtained through the reaction between chromium nitrate, chromium chloride, the chromium salt of an organic acid or chromic anhydride and hydrogen chloride, with ammonia. It is preferred to calcine the chromium compound at a temperature lower than 800° C. prior to its application. Alternatively, the catalyst may also be prepared from the above-described chromium compound, which has been obtained by reacting the chromium salt with ammonia, and a silicon compound. It is preferable to calcine the mixture of the chromium compound and silicon compound at a temperature lower than 800° C.

The chromium compound can usually be formed by reacting an aqueous solution of the above-described chromium salt with aqueous ammonia. It may also be feasible to use an ammonia-releasing compound, such as urea, in place of ammonia. Generally, the amounts of such chromium salts in water fall in the range of 3–30 wt. %. It is usually suitable to use aqueous ammonia the NH$_4$OH concentration of which ranges from 5% to 30%. The resulting precipitate is collected by filtration, washed and then dried. Thereafter, it is preferably calcined at a temperature lower than 800° C. for several to 20 hours or so in an air atmosphere, in vacuo or in an inert gas atmosphere such as nitrogen gas atmosphere to obtain a catalyst. After the calcination, the resultant catalyst is shaped by the tableting or extrusion method so that it can be used in a fixed-bed reactor. To prepare a catalyst suitable for use in a fluidized bed, the resultant precipitate is washed by decantation and is then converted into a slurry of a suitable concentration. In a spray drier, the slurry is formed into particles and then dried there. Thereafter, the thus-obtained particles are preferably calcined at a temperature lower than 800° C. to obtain a catalyst.

Namely, it is essential to use chromium nitrate, chromium chloride, the chromium salt of an organic acid, or a salt, which is obtained by the reaction of chromic anhydride and hydrogen chloride, as the starting material for the chromium compound employed in the process of this invention. It is also an essential requirement to use ammonia as an alkaline material for allowing the precipitate to occur.

When chromium sulfate, basic chromium sulfate, chromic acid, a bichromate or the like is used, it is impossible to obtain a catalyst of high activity and performance even if ammonia is used as a precipitant.

On the other hand, use of a caustic alkali such as caustic soda or caustic potassium or an alkali carbonate such as sodium carbonate or sodium bicarbonate as a precipitant makes it impossible to obtain any highly-active catalyst even if chromium nitrate or chromium chloride is used.

Similarly, it is impossible to obtain a highly-active catalyst from chromium oxide which has been obtained by subjecting chromium nitrate, chromic anhydride or commercial chromium hydroxide to pyrolysis.

It is essential to maintain the calcination temperature of the catalyst at a level lower than 800° C. If a catalyst is calcined at a temperature of 800° C. or higher, its catalytic activities are reduced sharply.

Although no particular limitation is imposed on the lower limit of the calcination temperature, it is generally preferable to effect its calcination at least at a temperature where the oxidation reaction of hydrogen chloride is carried out.

In many instances, the calcination is conducted by loading the dried precipitate in a separate calcination furnace. However, the calcination treatment may also be effected simultaneously with the reaction in a tubular reactor employed for the reaction.

The following methods may be followed to prepare the catalyst composed of the chromium compound and silicon compound. (1) A silicon compound, e.g., ethyl silicate is mixed in advance in an aqueous solution of the above-mentioned chromium salt. The resultant aqueous mixture is then reacted with ammonia, whereby chromium hydroxide and silicon hydroxide are coprecipitated. (2) Silica sol is mixed to an aqueous solution of the aforementioned chromium salt, followed by an addition of ammonia to form a precipitate. (3) The precipitate obtained from the above-mentioned chromium salt and ammonia is mixed and kneaded with a silica sol such as colloidal silica or fine silica particles in the presence of water. The thus-kneaded mass is air-dried at room temperature in a usual manner, dried at 80°–120° C. and then calcined into a catalyst. The mixed slurry of the chromium precipitate and the silicon compound may be formed into fine spherical particles and then dried in a spray drier. They may then be calcined to obtain a catalyst suitable for use in a fluidized bed. A mixed paste of the chromium precipitate and silicon compound may be extruded, dried and then calcined to obtain a catalyst suitable for use in a fixed bed.

As a still further alternative, the abovementioned compound obtained in the reaction of the chromium salt and ammonia may be washed, dried and optionally calcined. It may then be mixed with a silicon compound, for example, silica sol, silica gel, a silicic acid ester or the like. The resulting mixture may then be dried and optionally calcined again to obtain a catalyst. Here, the chromium and silicon compounds may be formed into a mixed slurry, which is then dried by spray drier. The resultant catalyst is suitable for use in a fluidized bed. On the other hand, the mixture of the chromium compound and silicon compound may be extruded to form a catalyst suitable for use in a fixed bed.

No particular limitation is generally imposed on the mixing ratio of chromium to silica. Expressing it in terms of the weight ratio of $Cr_2O_3$ to $SiO_2$ in the final product obtained eventually subsequent to the calcination of each catalyst, $Cr_2O_3/SiO_2$ may often range from 30/70 to 95/5.

The principal effect, which can be brought about from the addition of silica, resides in an increase to the mechanical strength of a catalyst, particularly, in an increase to the attrition resistance of a catalyst which has been formed into fine particles for use in a fluidized bed.

When chromic anhydride is used as a starting material for the catalyst, a catalyst is prepared by reacting chromic anhydride with hydrogen chloride in the following manner and then reacting the resultant reattion mixture further with ammonia in such a manner as mentioned above.

The reaction is carried out by adding and reacting chromic anhydride $CrO_3$ to an aqueous solution of hydrochloric acid or blowing hydrogen chloride gas into an aqueous solution of chromic anhydride dissolved in water. The reaction between chromic anhydride and hydrogen chloride is effected in the a temperature range of from room temperature to 100° C. As to the proportions of chromic anhydride and hydrogen chloride to be required, hydrogen chloride may generally be used in an amount of 6-20 moles as HCl per mole of $CrO_3$. The time required for the reaction may range from 10 minutes to 20 hours.

Ammonia is thereafter added into the above-described aqueous solution, whereby the pH of the aqueous solution is brought to the vicinity of the neutral level to precipitate a chromium compound. The thus-obtained precipitate is treated in the same manner as the above-mentioned process either as is or as a mixture with a silicon compound.

According to the process of this invention, it is possible to treat hydrogen chloride in a volume much greater than conventional processes, namely, an hourly HCl space velocity of 700-1800 $hr^{-1}$ at a temperature lower than those employed in the conventional processes, namely, at a temperature of 300°-360° C. or so. Moreover, the thus-achieved conversion reaches 100% of the equilibrium conversion. In other words, the present invention can achieve a high conversion of hydrogen chloride with an hourly space velocity much higher than any conventionally-known catalyst systems. Therefore, the present invention has provided an industrially-advantageous production process of chlorine, which permits efficient production of chlorine from hydrogen chloride.

The present invention will hereinafter be described by the following Examples.

EXAMPLE 1

Dissolved in 3 l of deionized water was 300 g of chromium nitrate nonahydrate. While thoroughly stirring the resultant solution, 285 g of 28% aqueous solution of ammonia was added dropwise over 10 minutes. The resultant slurry of precipitate was added with deionized water to dilute it to 20 l. After allowing the resultant mixture to stand overnight, it was subjected to repeated decantation to wash the precipitate. The precipitate was collected by filtration and air-dried. After drying the precipitate at 100°-120° C. for 6 hours, it was heated from 100°-600° C. in the course of 3 hours and then calcined at 550° C. for 4 hours in an electric furnace.

After the calcination, the catalyst was crushed. Fifteen grams of beads which had diameters in the range of 1-1.5 mm were packed in a reactor having an inner diameter of 1 inch and made of stainless steel and then externally heated to 340° C. in a fluidized sand bath.

At flow velocities of 200 ml/min. and 360 ml/min. (SV=2,280 $hr^{-1}$), hydrogen chloride gas and air were respectively preheated to 300° C. and then introduced in the catalyst layer to react them to each other.

The reactor off-gas was caught by a trap which consisted of an absorption bottle of an aqueous solution of potassium iodide and another absorption bottle of an aqueous solution of caustic soda, said bottles being connected in series. The aqueous solutions were titrated with sodium thiosulfate and hydrochloric acid to quantitatively analyze the unreacted hydrogen chloride and the resultant chlorine. The conversion of hydrogen chloride was 81%, which was equivalent to 100% of the equilibrium conversion at the above reaction temperature.

EXAMPLE 2

Dissolved in 3 l of deionized water was 200 g of chromium chloride hexahydrate. While thoroughly stirring the resultant solution, 290 g of 28% aqueous solution of ammonia was added dropwise to form a precipitate. The resultant slurry of the precipitate was added with deionized water to dilute it to 20 l. After allowing the resultant mixture to stand overnight, it was subjected to decantation to wash the precipitate. The precipitate was collected by filtration.

After air-drying the thus-collected precipitate, it was dried at 100° C. for 6 hours, heated to 550° C. in the course of 3 hours and then calcined at 550° C. for 4 hours in an electric furnace to prepare a catalyst.

Fifteen grams of the above catalyst were packed in an apparatus similar to that employed in Example 1. At a catalyst bed temperature of 355° C., hydrogen chloride and air were introduced respectively at flow velocities of 100 ml/min. and 185 ml/min. for their reaction. Chlorine occurred with a conversion of 70% based on the hydrogen chloride. The conversion was a value corresponding to 90% of the equilibrium conversion.

EXAMPLE 3

After a precipitate slurry obtained from chromium nitrate and aqueous ammonium in a manner similar to that in Example 1 was washed by decantation, the slurry was dried in a spray drier to obtain particulate powder. In a fluidized calcination furnace, the powder was calcined at 600° C. for 3 hours in a fluidized state while feeding air. A fraction of the catalyst, which fraction ranges from 100-150 mesh in particle size, was collected by sieving. Sixty grams of the catalyst fraction were packed in a fluidized-bed reactor having an inner diameter of 40 mm. The catalyst was externally heated to 340° C. in an electric furnace. Hydrogen chloride gas, oxygen gas and nitrogen gas were introduced respectively at 800 ml/min., 296 ml/min. and 300 ml/min. into the catalyst bed. While maintaining the catalyst in a fluidized state, the reactant gases were reacted. Chlorine gas was produced with a conversion of 76% based on hydrogen chloride.

EXAMPLE 4

After drying at 110° C. a precipitate which had been obtained in the same manner as in Example 1, the calcination temperature was changed to 400° C., 500° C., 600° C., 700° C., 800° C. and 900° C. to prepare 6 catalysts of different types. The calcination time was each 3.5 hours. In the same apparatus and method as those employed in Example 1, the reactant gases were reacted at 350° C. Results are summarized in Table 1.

TABLE 1

| Calcination temperature (°C.) | 400 | 500 | 600 | 700 | 800 | 900 |
|---|---|---|---|---|---|---|
| Conversion of hydrogen chloride (%) | 82 | 81 | 77 | 72 | 60 | 32 |

COMPARATIVE EXAMPLES 1-6

Catalysts were prepared by changing the starting material for chromium and precipitant in various ways. Reactions were carried out in an apparatus and precipitant similar to those employed in Example 1. Results are summarized in Table 2.

Incidentally, hydrogen chloride gas and air were fed at 400 Nl/kgCat.hr and 720 Nl/kgCat.hr respectively.

TABLE 2

| Comp. Ex. No. | Chromium source | Precipitant | Conversion of hydrogen chloride |
|---|---|---|---|
| 1 | chromium sulfate | ammonia | 31% |
| 2 | basic chromium sulfate | ammonia | 25% |
| 3 | chromium acetate | ammonia | 28% |
| 4 | potassium bicarbonate + HCl | ammonia | 38% |
| 5 | chromium nitrate | caustic soda | 35% |
| 6 | chromium chloride | caustic soda | 28% |

COMPARATIVE EXAMPLES 7-13

Using catalysts obtained respectively by subjecting chromium nitrate, chromic anhydride, ammonium chromate and commercial chromium hydroxide to pyrolysis and then calcining the resultant pyrolysates at 500° C., reactions were respectively carried out in the same apparatus and under the same conditions as those employed in Example 1. Results are shown in Table 3. Furthermore, silica gel beads having a surface area of 150 m²/g and an average pore diameter of 100 Å were impregnated with an aqueous solution of chromium chloride. The thus-impregnated silica gel beads were dried and then calcined at 400° C. Results obtained respectively by using the thus-obtained catalyst and commercial chromium oxide catalysts ("X-421", trade name; product of Nikki Chemical Industries, Ltd.) and ("G-41", trade name; Girdler Company) are also given in Table 3.

TABLE 3

| Comp. Ex. No. | Chromium source | Conversion of hydrogen chloride |
|---|---|---|
| 7 | chromium nitrate | 25% |
| 8 | chromic anhydride | 36% |
| 9 | commercial chromium hydroxide | 18% |
| 10 | chromium chloride/SiO$_2$ | 21% |
| 11 | commercial chromium oxide catalyst (X-421) | 24% |
| 12 | commercial chromium oxide catalyst (G-41) | 7% |
| 13 | ammonium chromate | 42% |

EXAMPLE 5

Dissolved in 3 l of deionized water was 300 g of chromium nitrate nonahydrate. While thoroughly stirring the resultant solution, 285 g of 28% aqueous solution was added dropwise over 15 minutes. The resultant precipitate was washed by decantation. After collecting the thus-washed precipitate by filtration and then air-drying same, it was dried at 100°–120° C. for half a day. It was then calcined at 500° C. for 3 hours. The thus-obtained chromium oxide was ground into fine powder in a mortar. The powdery chromium oxide was added with 28 g of silica sol ("Snowtex", trade name; product of Nissan Chemical Industries, Ltd.), followed by a further addition of 25 g of water. The resultant mixture was kneaded. After the kneading, the resultant paste was extruded into pellets of 3 mm in diameter and 4 mm in length. After drying the pellets at 100° C., they were calcined at 550° C. for 4 hours to prepare a catalyst. The circumferential breaking strength of the catalyst was 3.5–3.8 kg. Accordingly, the catalyst shows sufficient strength as an industrial catalyst.

Fifty grams of the catalyst were packed in a reactor having an inner diameter of 1 inch and made of stainless steel and were then externally heated to 350° C. in a fluidized sand bath. At flow velocities of 4.8 Nl/hr. and 90 Nl/hr., hydrogen chloride gas and air were respectively introduced into the catalyst layer to react them to each other. The reaction gas was sampled, and the unreacted hydrogen chloride and the thus-produced chlorine were quantitatively analyzed. The analysis showed that chlorine was produced at a conversion of 76% based on hydrogen chloride.

EXAMPLE 6

Dissolved in 3 l of deionized water was 300 g of chromium nitrate nonahydrate, followed by an addition of 72 g of an ethyl silicate solution. While thoroughly stirring the resultant mixture, liquid ammonia was added dropwise to obtain a co-precipitated compound of chromium hydroxide and silica hydrogel. The compound was dried by a pressurized-nozzle spray drier to obtain fine spherical beads. They were calcined at 600° C. in a fluidized state to prepare a catalyst. Eighty grams of the catalyst were placed in a fluidized-bed reactor having an inner diameter of 40 mm. The catalyst was externally heated to 350° C. Hydrogen chloride and oxygen were introduced respectively at 55 Nl/hr. and 25 Nl/hr. into the catalyst bed for their reaction. Chlorine was produced at a conversion of 81% based on the hydrogen chloride.

EXAMPLE 7

Dissolved in 3 l of deionized water was 300 g of chromium nitrate nonahydrate, followed by a dropwise addition of 28% aqueous ammonia to cause chromium hydroxide to precipitate. The thus-obtained precipitate was collected by filtration, to which 200 g of silica sol ("Snowtex", trade name; product of Nissan Chemical Industries, Ltd.) was added. They were mixed thoroughly into a slurry. The slurry was then dried in a spray drier to convert it into fine spherical beads. They were then calcined at 500° C. in a fluidized state to prepare a catalyst. Using the the catalyst, hydrogen chloride and oxygen were reacted under the same conditions as in Example 6, thereby achieving a conversion of 79% based on the hydrogen chloride.

EXAMPLE 8

Dissolved in 3 l of deionized water was 300 g of chromium nitrate nonahydrate, followed by a dropwise addition of 28% aqueous ammonia to cause chromium hydroxide to precipitate. After washing, filtering and drying the precipitate, the precipitate was calcined at 400° C. for 3 hours to convert it into chromium oxide and the chromium oxide was ground into particles of 100 mesh and smaller.

The above-obtained powder was added with 50 g of silica sol ("Snowtex", trade mark; product of Nissan Chemical Industries, Ltd.) and 15 g of water. They were thoroughly mixed and kneaded in a kneader. The resulting paste was extrusion into pellets of 3 mm in diameter and 4 mm in length. They were dried and then calcined at 550° C. for 4 hours, thereby preparing a catalyst.

Using the the catalyst, hydrogen chloride and oxygen were reacted under the same conditions as in Example 5, thereby achieving a conversion of 79% based on the hydrogen chloride.

EXAMPLES 9–11

Changing the starting catalyst raw material in various ways, chromia-silica catalysts were prepared in accordance with the procedure of Example 5. Reactions were conducted in the same manner as in Example 5, using the above-mentioned chromia-silica catalysts respectively. Reaction results are summarized in Table 4.

TABLE 4

|  | Chromium source | Precipitant | Conversion of hydrogen chloride |
| --- | --- | --- | --- |
| Comp. Ex. No. | | | |
| 14 | chromium nitrate | NaOH | 23% |
| 15 | chromium nitrate | KOH | 19% |
| 16 | chromium sulfate | aqueous ammonia | 20% |
| 17 | chromium alum | aqueous ammonia | 17% |
| Ex. No. | | | |
| 9 | chromium chloride | aqueous ammonia | 68% |
| 10 | chromium acetate | aqueous ammonia | 74% |
| 11 | chromium propionate | aqueous ammonia | 70% |

EXAMPLE 12

Catalysts were obtaned by calcining portions of a chromia-siliva catalyst, which has been obtained in the same manner as in Example 5, at various calcination temperatures. Their activities were measured. The reaction conditions were the same as those employed in Example 5. Results are given in Table 5.

TABLE 5

| Calcination | 350 | 400 | 500 | 600 | 700 | 800 | 900 |
| --- | --- | --- | --- | --- | --- | --- | --- |
| temperature (°C.) | | | | | | | |
| Conversion of hydrogen chloride (%) | 76 | 78 | 77 | 77 | 70 | 53 | 31 |

EXAMPLE 13

A precipitate, which had been obtained by adding aqueous ammonia to an aqueous solution of chromium nitrate, was collected in the form of a slurry by filtration. The slurry was mixed with silica sol in such an amount that the weight ratio of $Cr_2O_3$ to $SiO_2$ became 1:1. The resultant mixture was continuously stirred for 3 hours to obtain a homogeneous slurry. This slurry was dried in a spray drier and then calcined at 500° C. to prepare a fine spherical catalyst for use in a fluidized bed. Under the same reaction conditions as those employed in Example 6, its catalytic activity was measured. As a result, chlorine was produced at a conversion of 73% based on hydrogen chloride.

EXAMPLE 14

Five hundred grams of chromic anhydride were added to and dissolved in 3 l of 35% hydrochloric acid. They were reacted at 65° C. for 1 hour with stirring After completion of the reaction, nitrogen gas was bubbled at 70 lC for 10 minutes through the reaction mixture. The thus-treated reaction mixture was allowed to cool down, to which deionized water was added to dilute same to a total volume of 6 l. With thorough stirring, 1.9 l of 28% aqueous ammonia was added over 3 hours.

The thus-formed precipitate was collected by filtration and was then washed. It was then converted into a paste-like form by a kneader, followed by its extrusion. After drying the extrudates at 100° C. for 5 hours, they were calcined at 250° C. for 3 hours and then at 600° C. for additional 3 hours to prepare a tablet-like catalyst of 4 mm in diameter and 5 mm in height.

One hundred grams of the catalyst was packed in a reactor having an inner diameter of 1 inch and made of Hastelloy-C. The catalyst bed was externally heated to 340° C. in a fluidized sand bath. A gaseous mixture of 80 l/hr. of hydrogen chloride gas and 30 l/hr. of oxygen was fed to the reactor. Chlorine in the resultant gas was analyzed. Chlorine was produced at a conversion of 80% based on the hydrogen chloride.

EXAMPLE 15

Five hundred grams of chromic anhydride were added to and dissolved in 3 l of 35% hydrochloric acid. They were reacted at 70° C. for 30 minutes with stirring. After completion of the reaction, air was bubbled at 70° C. for 10 minutes through the reaction mixture. The thus-treated reaction mixture was allowed to cool down, to which deionized water was added to dilute same to a total volume of 7 l. With thorough stirring, 1.9 l of 28% aqueous ammonia was added over 3 hours.

The thus-formed precipitate was washed with water and then collected by filtration. It was then added with 750 g of silica sol ($SiO_2$ content 20 wt. %) and the resultant mixture was thoroughly stirred into a homogeneous slurry. After adjusting the concentration of the slurry to about 6.5%, it was dried and formed into small particles in a spray drier. The particles were thereafter calcined at 250° C. for 2 hrs. and then at 600° C. for 3 hours in air, thereby preparing a fine particulate catalyst suitable for use in a fluidized bed. The catalyst had an average particle size of 65 μm and a packing density of 1.2. Fine particles having good attrition resistance were obtained.

In a fluidized-bed reactor having an inner diameter of 2 inches, 350 g of the catalyst was packed. Into the catalyst bed, hydrogen chloride and oxygen were introduced respectively at 240 l/hr. and 90 l/hr. under a total pressure of 3 kg/cm$^2$. The reactor was externally heated to 340° C. to react the hydrogen chloride and oxygen. Chlorine was produced at a conversion of 78% based on the hydrogen chloride.

Having now fully described the invention, it will be apparent to one of ordinary skill in the art that many changes and modifications can be made thereto without departing from the spirit or scope of the invention as set forth herein.

What is claimed is:

1. A process for producing chlorine by the oxidation of hydrogen chloride with an oxygen-containing gas, the process comprising:
   (i) contacting reactants consisting of hydrogen chloride and the oxygen-containing gas with a catalyst; wherein a molar ratio of oxygen to hydrogen chloride in the range of 0.2 to 1 is used; wherein the hydrogen chloride and the oxygen-containing gas are contacted with the catalyst at a temperature of from 300° C. to 450° C. and at a pressure of from atmospheric pressure to 10 kgcm$^{-2}$G; wherein said catalyst is prepared from a chromium compound obtained by reaction of chromium nitrate, or the chromium salt of an organic acid, with ammonia, and then calcination at a temperature lower than 800° C.; and
   (ii) obtaining chlorine.

2. The process of claim 1, comprising effectuating the oxidation of the hydrogen chloride at a temperature of from 300° C. to 400° C.

3. The process of claim 1, comprising effectuating the oxidation of the hydrogen chloride at a temperature of from 300° C. to 360° C.

4. The process of claim 3, comprising using as the catalyst said chromium compound in combination with a silicon compound.

5. The process of claim 4, comprising using $Cr_2O_3$/$SiO_2$ in a weight ratio of from 30/70 to 95/5.

6. The process of claim 2, comprising using as the catalyst said chromium compound in combination with a silicon compound.

7. The process of claim 6, comprising using $Cr_2O_3$/$SiO_2$ in a weight ratio from 30/70 to 95/5.

* * * * *